United States Patent [19]
Palazzetti et al.

[11] 3,773,136
[45] Nov. 20, 1973

[54] AUTOMATIC MOTORWAY DRIVING SYSTEM FOR MOTOR VEHICLES

[75] Inventors: Mario Palazzetti; Bruno Cavallarin, both of Turin, Italy

[73] Assignee: FIAT Societa per Azioni, Turin, Italy

[22] Filed: Jan. 14, 1972

[21] Appl. No.: 217,905

[30] Foreign Application Priority Data
Jan. 29, 1971  Italy .............................. 67306 A/71

[52] U.S. Cl. ................. 180/98, 318/587, 340/52 R, 340/104
[51] Int. Cl. ......................... B60k 27/06, B62d 1/28
[58] Field of Search ...................... 180/98, 79, 79.1; 318/587; 340/104, 61

[56] References Cited
UNITED STATES PATENTS

| | | | |
|---|---|---|---|
| 3,198,279 | 8/1965 | Quinn | 180/79 |
| 3,085,646 | 4/1963 | Paufue | 180/98 |
| 2,847,080 | 8/1958 | Zworykin et al. | 180/98 |
| 3,029,893 | 4/1962 | Mountyoj | 180/98 |
| 3,018,367 | 1/1962 | Mountjoy | 180/98 |
| 3,078,944 | 2/1963 | Gray | 180/98 |
| 3,159,826 | 12/1964 | Morrison | 180/98 X |
| 3,270,199 | 8/1966 | Smith | 180/98 X |
| 3,556,244 | 1/1971 | Gray | 180/98 |

Primary Examiner—Kenneth H. Betts
Assistant Examiner—John P. Silverstrim
Attorney—Richard C. Sughrue et al.

[57] ABSTRACT

This invention relates to an automatic motorway driving system in which passive rectangular coils are buried in a motorway, preferably in both the normal driving and overtaking lanes, for cooperation with a front transmitter loop and two rear receiver loops carried by each vehicle. Each vehicle has an alternating current generator which applies an alternating current to the transmitter loop and which scans a range of frequencies cyclically so that signals picked up through inductive linkage of the receiver loops with the buried coils can provide servo control signals indicative of the distance of preceding vehicles or the presence of overtaking vehicles. The two receiver loops symmetrically placed at opposite sides of the vehicle and electronic comparison of the signals picked-up thereby is used to control a vehicle steering servomechanism to maintain the vehicle centrally in the normal driving lane.

5 Claims, 6 Drawing Figures

AUTOMATIC MOTORWAY DRIVING SYSTEM FOR MOTOR VEHICLES

BACKGROUND AND OBJECTS OF THE INVENTION

This invention relates to an automatic motorway driving system for motor vehicles.

Automatic motorway driving systems are known which in general involve controlling the driving of a motor vehicle in dependence upon external signals and instructions, provided, for example, by a buried cable and fed so as to impart instructions to every single vehicle on the motorway. Information is collected by the motorway cable through electronic apparatus, and an appropriate servomechanism modifies the vehicle driving conditions according to the instructions received through the motorway cable. Information as to the movements of individual vehicles is transformed into electrical signals and transmitted to a central control system which sorts in its turn the data received.

The most evident disadvantages inherent in such known arrangements lie in the fact that the buried cable must be continuously fed and each stretch of cable must be connected to subsidiary feeding devices, disposed, for example, at the road edges or interspaced according to the available power needs.

Furthermore it is necessary each time to perform manual control to adapt the motorway installation to the vehicle-mounted systems on the different cars. No solution is provided in this way to the problem of a motor vehicle changing its lane on a motorway, and in particular the danger presented by overtaking vehicles. Consequently, no overtaking would be possible with such a known system.

A main object of this invention is to provide an automatic motorway driving system for motor vehicles on an equipped motorway, in which the equipment buried in the motorway is entirely passive, not requiring any feeding of electrical signals thereto.

A preferred embodiment of this invention has as its object an automatic motorway driving system which allows both speed control of a vehicle in relation to that of the preceding vehicle, and changing of lane of a vehicle with a view to overtaking of a vehicle which precedes it.

A further object of this invention is the provision of an automatic motorway driving system as aforesaid, in which the buried equipment is relatively simple and economical.

SUMMARY OF THE INVENTION

According to the invention there is provided an automatic motorway driving system comprising a specially equipped motorway having a normal driving lane and an overtaking lane and vehicles having electrically controlled steering and equipped with an installation adapted to cooperate with the motorway, wherein:

the motorway is provided with a series of closed substantially rectangular conductive coils, buried beneath and parallel to the motorway surface with their long sides arranged symmetrically with respect to and parallel to the longitudinal axis of the normal driving lane of the motorway;

the vehicle installation includes an alternating voltage generator, a transmitter loop connected to the generator and disposed at the front of the vehicle on the longitudinal axis thereof, two receiver loops disposed symmetrically with respect to the longitudinal axis of the vehicle at the rear of the latter and adapted to be coupled inductively with successive coils in the normal driving lane of the motorway, and a first comparison circuit connected to the two receiver loops and comparing the amplitudes of the signals picked-up by the receiver loops to provide an output signal controlling the vehicle steering.

The system preferably includes a second comparison circuit having one input connected to one of the two receiver loops for comparing the repetition frequency of the signal picked-up at said receiver loop, due to the passing of the vehicle from one buried coil to another, with a reference signal, representative of a desired speed, the output of the second comparison circuit being connected to a servo-mechanism operating the vehicle accelerator and to a servo-mechanism controlling the vehicle brakes.

In a preferred embodiment of the invention the alternating voltage generator mounted on each vehicle using the motorway generates a voltage the frequency of which increases from one end to the other of each buried coil of the normal driving lane, so that the signal picked by one of the receiver loops is applied to detecting means which determine if such signal contains, in addition to the instantaneous frequency of the transmitter loop of the vehicle in question, also an extraneous, higher, frequency due to any preceding vehicle, and means responsive to detection of such extraneous frequency to actuate the servomechanism controlling the vehicle brakes by an amount inversely proportional to the difference between the two frequencies.

The motorway preferably also includes conductive coils buried parallel to the motorway surface, aligned along the axis of the overtaking lane, said coils having a substantially rectangular shape symmetrically disposed with respect to the axis of the overtaking lane and further having a supplementary loop which extends into the gap between the adjacent ends of two coils of the normal driving lane, such that the signal picked by one of the receiver loops is also applied to a rectifying circuit the output of which controls an indicator when the overtaking lane of the motorway is clear by way of a gate which is enabled by means responsive to movement of the vehicle past the end of a coil in the normal driving lane and which is disabled by sensitive means upon movement of said receiver loop past the beginning of a coil in the normal driving lane.

BRIEF DESCRIPTION OF THE DRAWINGS

The invention will now be described, merely by way of example, with reference to the accompanying drawings, in which.

DETAILED DESCRIPTION OF THE ILLUSTRATED EMBODIMENT

Figure 1:
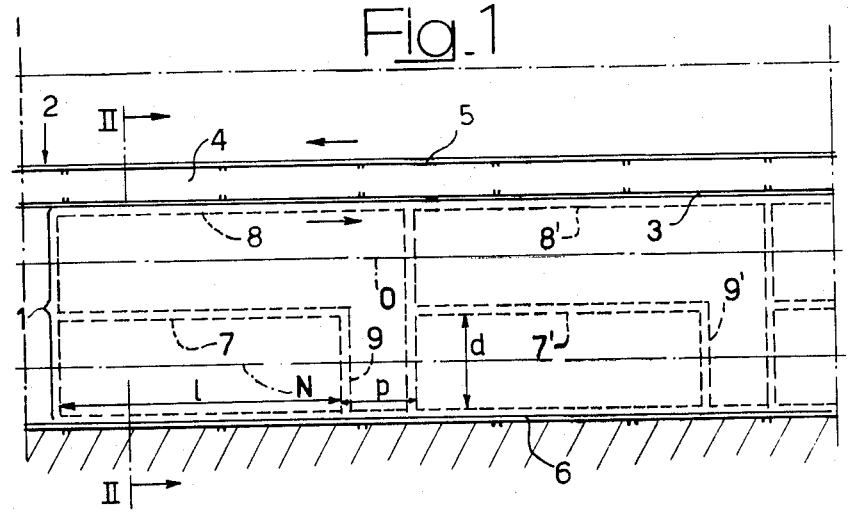
FIG. 1 is a diagrammatic plan view of a stretch of motorway equipped to form part of an automatic driving system according to one embodiment of the invention.
Figure 2:
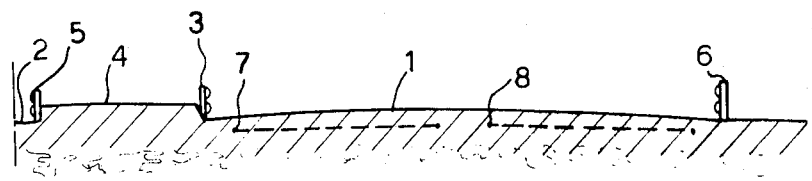
FIG. 2 is a cross-sectional view along line II—II of FIG. 1.

FIGS. 1 and 2 illustrate in partially schematic form one carriageway 1 of a motorway equipped for use with an automatic driving system according to this invention, part of the adjoining carriageway being indicated by 2. The two carriageways 1, 2 are used by vehicles travelling in opposite directions. The driving direction for each of the two carriageways 1, 2 is indicated by an arrow in the drawing. The two carriageways 1, 2 are separated by a central barrier 4, formed for example by a pair of steel guard rails 3 and 5 facing outwardly towards the respective carriageways. Since the two carriageways are identical, the equipment provided in one carriageway, 1, only will be described. The carriageway 1 is bounded by the rail 3 along one edge and by a further rail 6 along its other edge.

The carriageway 1 has two driving lanes, namely a normal driving lane having a longitudinal axis N and an overtaking lane having a longitudinal axis O.

A series of closed identical coils 7, 7' made of conductive metal cable are spaced apart at regular intervals in the normal driving lane, the coils 7, 7' being buried in the tarmac of the carriageway 1 and arranged symmetrically with respect to the axis N. The coils 7, 7' are rectangular with their longer sides, of length $l$, parallel to the axis N and their shorter sides, of length $d$, perpendicular to the axis N, the distance along the axis N between one coil 7 and the next coil 7' being denoted by p. The coils 7, 7' are substantially parallel to the surface of the carriageway 1. In a typical example each coil 7 has dimensions $l = 100\ m$ and $d = 1.20\ m$.

Two further rectangular coils 8, 8' are also buried in the carriageway 1 in the overtaking lane in the same plane as the coils 7, 7' with their longer sides parallel to and symmetrically disposed about the axis O, with a length of substantially $l + p$. Each coil 8, 8' has a lateral rectangular supplementary loop 9, 9' which projects into and substantially fills the gap $p$ between the adjacent coils 7, 7' of the normal driving lane.

Figure 3:
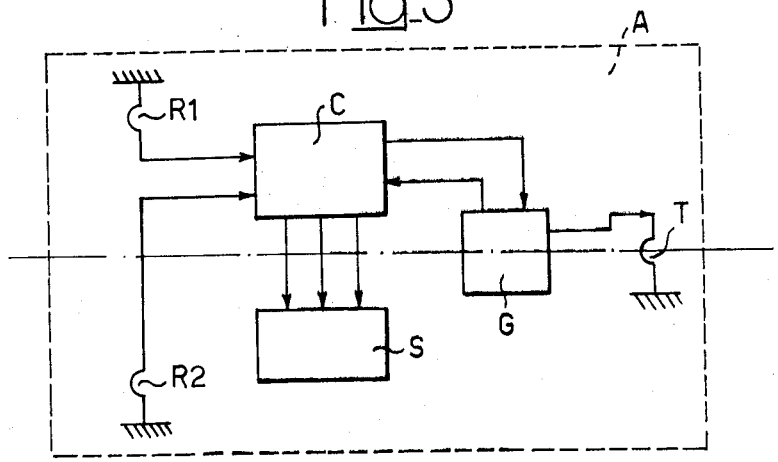
FIG. 3 is a block diagram of the vehicle installation which forms part of the automatic driving system for vehicles adapted to use the motorway of FIGS. 1 and 2.

FIG. 3 illustrates schematically the equipment carried by each vehicle using the motorway of FIGS. 1 and 2. This equipment is adapted to interact with the coils 7, 8 buried in the motorway in order to effect automatic driving of the vehicle.

A transmitter loop T is mounted at the front of a vehicle A, indicated by a broken outline. It will be supposed that the loop T is disposed directly over a coil of the normal driving lane, for example the coil 7. A low frequency (LF) voltage generator G feeds alternating current to the loop T for example at a frequency of about 100 kHz, inducing an electromotive force in the coil 7 over which the vehicle is located. Two receiver loops R1, R2 are carried at the rear of the vehicle and arranged symmetrically on opposite sides of its longitudinal axis. The loops R1, R2 are inductively coupled to the coil 7 and are connected to a control circuit C which utilises the signals picked up by the receiver loops R1, R2 to generate control signals for a servosystem S for adjusting the steering and speed of the vehicle A.

Figure 4:
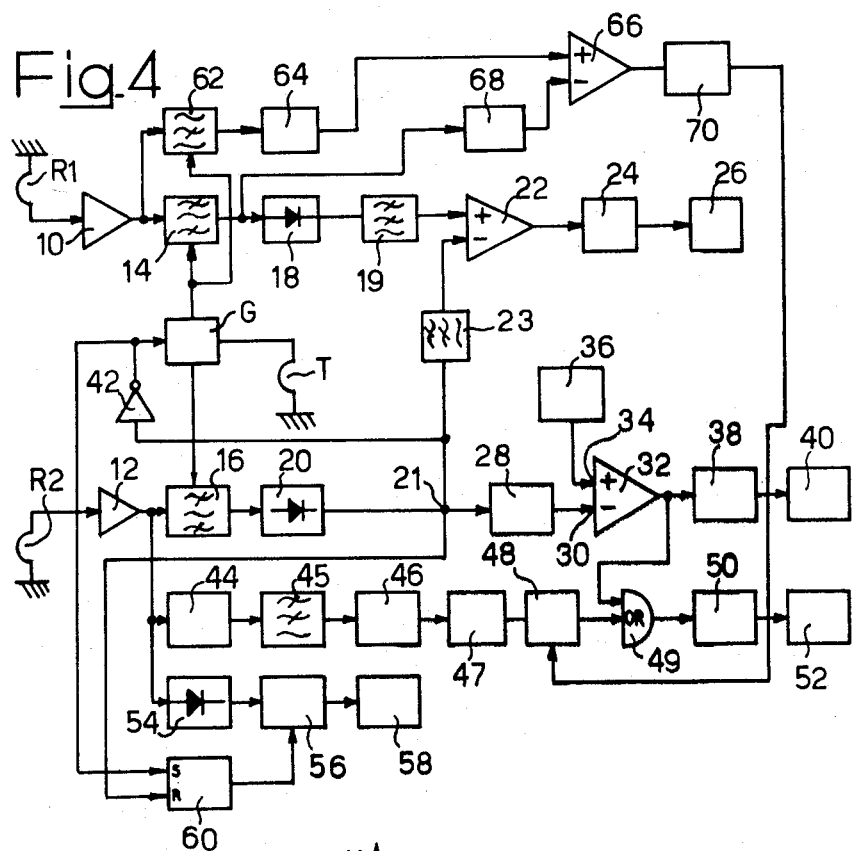
FIG. 4 is a more detailed block schematic diagram of the vehicle installation of FIG. 3, and FIGS. 5 and 6 are graphs illustrating the operation of the invention.

FIG. 4 is a block diagram showing more detail of the vehicle installation represented in FIG. 3. The generator G generates an alternating voltage the frequency of which increases progressively from the beginning to the end of each coil encountered by the vehicle. Thus the generator G includes a frequency scanning oscillator which commences a cycle at each transition from one coil to another by means described later.

Figure 6:
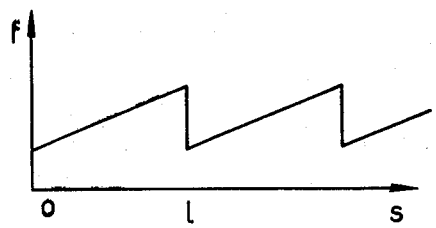

The frequency variation of the voltage supplied to the transmitter loop T is represented on the graph of FIG. 6, which plots the frequency $f$ (ordinate) as a function of the distance $s$ (abscissa) covered by the vehicle A. Through the intermediary of the coils buried in the tarmac, the receiver coils R1 and R2 each pick up this signal and apply it respectively to two amplifiers 10 and 12 respectively. The outputs of the amplifiers 10 and 12 are applied to adjustable narrow band frequency selective filters 14, 16 respectively. The generator G also applies its output signal direct to the frequency selective filters 14, 16 to adjust the central frequency of the pass band of each filter so that it always corresponds to the instantaneous frequency generated by the generator G. The filters 14, 16 can for example comprise inductive and capacitive elements, in which the capacitances are formed at least in part by "varicap" diodes controlled by the generator G.

The narrow band filters 14, 16 effectively block any signals picked up by the receiver loops R1, R2 and derived from other vehicles using the motorway.

The output signals from the frequency selective filters 14, 16 are rectified in rectifying circuits 18, 20 respectively, the rectified outputs being applied to the two inputs of a differential amplifier 22 through respective low-pass filters 19, 23. The output signal of the differential amplifier 22 is proportional in amplitude and sign to the lateral displacement of the vehicle with respect to the longitudinal axis N of the normal driving lane. This output signal, after amplification in a power amplifier 24, is utilised directly to control an electrically controlled steering servomechanism 26 for the vehicle A, in such a manner as to return the vehicle A to a position in which its longitudinal axis is directly above the axis N, of the normal driving lane, whereupon the differential amplifier 22 will cease to provide an output.

Figure 5:
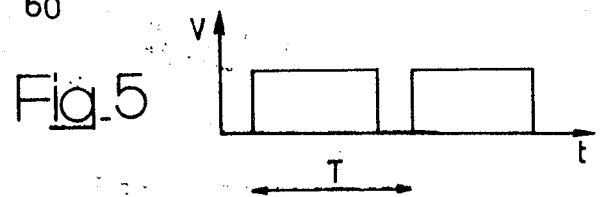

To regulate the speed of the vehicle use is made of the output signal at 21 of the rectifying circuit 20. The waveform of this output signal is illustrated in FIG. 5. The signal is formed by a series of long pulses generated during the interaction of the vehicle A with the buried coils 7, interspaced by relatively shorter blank periods during the passage of the vehicle from one coil 7 to another. The repetition frequency F of the pulses is clearly given by $F = v/(l + p)$ where $v$ is the speed of the vehicle, $l$ is the length of a coil longitudinally of the normal driving lane and $p$ is the gap between adjacent coils 7. The pulse repetition frequency $F$ present at the output of the rectifying circuit 20 is therefore proportional to the speed of the vehicle. This train of pulses is applied to a frequency voltage convertor 28, which supplies to one input 30 of a differential amplifier 32 a direct voltage proportional to the pulse repetition frequency unit, therefore, to the speed of the vehicle.

The second input 34 of the differential amplifier 32 receives a direct reference voltage from a direct voltage generator 36, which can be regulated to provide a reference voltage representative of a desired speed of the vehicle. The voltage generator 36 can comprise, for example, a potentiometer whose fixed terminals are connected across a source of stabilised voltage, and whose movable contact is connected to the input 34 of the differential amplifier 32.

The output of the differential amplifier 32 therefore represents, in amplitude and sign, changes in the speed of the vehicle with reference to a desired speed represented by the voltage provided by the generator 36. This output is then applied to a power amplifier 38 which controls a servomechanism 40 for operating the vehicle accelerator or throttle.

The output of the differential amplifier 32 also forms one input of an OR gate 49 which transmits the signal by way of a power amplifier 50 to a servomechanism 52 for controlling the vehicle brakes.

The signal at the output of the rectifier circuit 20, at point 21, has a waveform as illustrated in FIG. 5. This signal is passed through an invertor 42, the output of which triggers the operation of the generator G with its leading edge, initiating the frequency scanning of the generator.

This invention preferably also provides means to ensure the maintainance of at least a given safe distance between a vehicle and the vehicle which immediately precedes it on the motorway. For this purpose advantage is taken of the fact that, if all vehicles transmit signals with the same frequency characteristics, the transmitted frequency of a vehicle at a given instant will always be greater than the frequency transmitted by a following vehicle. When the two vehicles are located over the same coil, the vehicle which follows therefore receives two frequencies, one of which is its own frequency while the other is an extraneous higher frequency emitted by the preceding vehicle.

The output of one of the receiver loops, for example, the output of the amplifier 12 connected to the loop R2, is applied also to a non-linear detecting element 44, for example a diode circuit, which causes an intermodulation between the two frequencies picked by the receiver loop R2. The output of the element 44 will therefore include, in addition to the two abovementioned frequencies, also their difference, their sum, and in general various linear combinations of the two frequencies. A low-pass filter 45 at the output of the non-linear element 44 transmits only the frequency difference or beat frequency beteen the frequencies of the two signals picked by the receiver coil R2. In order to ensure that only this best frequency is transmitted by the filter 45, the upper cut-off frequency of the filter 45 must be equal to the difference between the minimum and the maximum frequency generated by the generator G, and by all corresponding generators of other vehicles.

The output of the low-pass filter 45 on a given vehicle will have a frequency inversely proportional to the distance of the vehicle from the immediately preceding vehicle. A frequency-voltage convertor 46 converts this frequency into a continuous voltage proportional to said frequency. The output signal of the convertor 46 is passed to an invertor 47 the output voltage of which is inversely proportional to the distance of the vehicle from the preceding vehicle. The output of the invertor 47 is passed through a gate 48 and an OR gate 49 to a power amplifier 50 the output of which controls a brake servo-mechanism 52.

It is important to avoid the erroneous automatic application of the vehicle brakes in response to the picking-up of a signal of different frequency from that which the vehicle is transmitting, corresponding to a following vehicle rather than a preceding vehicle, which could give rise to a beat frequency identical to that caused by the frequency of a preceding vehicle, as described previously. For this purpose the gate 48 is arranged to open only in the case when the extraneous frequency picked is higher than the instantaneous frequency of the generator G, by using a device described later on.

The output of the amplifier 10 is passed through a band-stop filter 62 having a narrow stop band the mean frequency of which is controlled by the generator G. The filter 62 eliminates the frequency transmitted by the transmitter loop T on the vehicle at any given instant. The output of the filter 62 contains only the frequency emitted by any other vehicle present on the coil. The filter 62 is followed by a frequency-voltage convertor 64 which provides an output voltage proportional to the frequency transmitted by the filter 62, this voltage forming one input of a differential amplifier 66 the second input of which comprises the output signal of a frequency-voltage convertor 68, fed by the output signal of the frequency selective filter 14, at a frequency which is characteristic of the vehicle at any given instant.

Consequently the output of the differential amplifier 66 is positive if the frequency of its second input is higher than the characteristic frequency of the vehicle, and negative in the opposite case. A sign detector 70 is connected to the output of the differential amplifier 66 and is adapted to supply an output only if its input signal is positive. The sign detector 70 is connected to the gate 48 which is therefore enabled only if the second vehicle on the coil precedes the vehicle on which the installation of FIG. 4 is mounted.

Advantageously simple means are provided to limit the speed of the vehicle to values lower than the maximum safe speed for given stretches of motorway such as curves, humps for example, where it is advisable to reduce the speed for safety reasons. For this purpose it suffices, in correspondence with such stretches, to provide buried coils of smaller length than the coils in straight stretches of the motorway, the reduction in length being related directly to the degree of danger of the stretch in question. In this way the repetition frequency of the pulses at the circuit point 21 increases according to the danger of the stretches of motorway, controlling the servo-mechanisms 40 and 52 for the accelerator and the brake respectively, to limit the vehicle speed.

This invention also provides means for warning the passengers of a vehicle of the presence of a vehicle in the adjacent overtaking lane, with the object of indicating to the driver whether or not it is safe to overtake.

It is possible for a vehicle in the normal driving lane of the motorway to detect the presence of a vehicle about to overtake in the overtaking lane by virtue of the supplementary loops 9, 9' which project into the gaps $p$ between the coils 7, 7' of the normal driving lane.

The two receiver loops R1, R2 of the vehicle proceeding in the normal driving lane, in passing from one coil 7 to the next coil 7', are for a certain time inductively coupled with coil 8 through its supplementary loop 9. If the coil 8 is not occupied by any vehicle, so that overtaking is safe, no signal is picked in the gap $p$ between the coils 7 and 7'. If, on the other hand, a vehicle is about to overtake in the overtaking lane and its transmitter loop T is inductively coupled with coil 8, the receiver loop R2 of a vehicle, in passing from coil 7 to coil 7', picks up a signal from the supplementary loop 9 at a moment when the receiver is normally silent.

Upon picking-up such a supplementary loop signal the output signal of the amplifier 12 is directly applied to a rectifier circuit 54, the output of which passes through a gate 56 which, as will be described, is open only during the time in which the receiver loop R2 finds itself in the gap P between successive coils 7, 7' of the normal driving lane. When the rectified output is passed through the gate 56 it energises an indicator 58 showing that the overtaking lane is occupied.

The gate 56 is opened by the output signal of a bistable multivibrator 60. The multivibrator 60 is set by the output signal of the convertor 42 which indicates the end of a coil of the normal driving lane, and is reset by the leading edge of the signal at the circuit point 21, which indicates the beginning of a successive coil in the normal driving lane. It is therefore ensured that the indicator 58 is energised only by signals picked up by the supplementary loops 9, 9' of the coils 8, 8' of the overtaking lane, without the risk of erroneous energisation of the indicator 58 by signals from the coils 7, 7' of the normal driving lane.

The system which has been described is believed to be the most advantageous and preferred embodiment of this invention. It will be appreciated, however, that many variations and modifications may be made within the scope of this invention as defined in the claims.

We claim:

1. Automatic motorway driving system comprising a specially equipped motorway having a normal driving lane and an overtaking lane and vehicles having electrically controlled steering and equipped with an installation adapted to cooperate with the motorway, wherein:
   the motorway is provided with a series of closed substantially rectangular conductive coils, buried beneath and parallel to the motorway surface with their long sides arranged symmetrically with respect to and parallel to the longitudinal axis of the normal driving lane of the motorway;
   the vehicle installation includes an alternating voltage generator, a transmitter loop connected to the generator and disposed at the front of the vehicle on the longitudinal axis thereof, two receiver loops disposed symmetrically with respect to the longitudinal axis of the vehicle at the rear of the latter and adapted to be coupled inductively with successive coils in the normal driving lane of the motorway, and a first comparison circuit connected to the two receiver loops and comparing the amplitudes of the signals picked-up by the receiver loops to provide an output signal controlling the vehicle steering,
   each vehicle having a brake control servomechanism, the alternating voltage generator mounted on each vehicle generating a voltage the frequency of which increases as the vehicle passes from one end to the other of each buried coil of the normal driving lane of the motorway and in which the signal picked by one of the receiver loops is applied to detecting means which determine if such signal contains, in addition to the instantaneous transmitted frequency of the vehicle in question, also an extraneous, higher, frequency due to a preceding vehicle, said means in such case actuating said brake control servomechanism by an amount inversely proportional to the difference between the two frequencies.

2. Automatic driving system as defined in claim 1, in which the detector means include a band-stop filter having a narrow stop band connected to one of said receiver loops and controlled by the alternating voltage generator to eliminate the frequency of the signal applied to the transmitter loop at any given instant, a third comparison circuit which compares the frequency of the output signal of the band-stop filter with the said frequency of the signal applied to said transmitter loop and a gate inserted between said detecting means sensitive to the difference of frequency and the brake control servomechanism, said gate receiving an enabling signal from said third comparison circuit when the frequency of the output signal of the band-stop filter is higher than the instantaneous frequency of the signal applied to said transmitter loop of the vehicle.

3. Automatic driving system as defined in claim 1, in which said detecting means sensitive to the differene of frequency comprise a non-linear element connected to one of the receiver loops, a low-pass filter having a pass frequency equal to the maximum possible difference in frequency between the instantaneous transmission frequency of the vehicle and the said extraneous frequency, connected to the output of the non-linear element, and means applying the output of the low-pass filter to the brake control servomechanism to apply the brakes in dependence upon said frequency difference.

4. Automatic driving system as defined in claim 1, including rectifier circuits and respective low pass filters connecting each receiver loop to said first comparison circuit, and an inverter connected to the output of one of said rectifying circuits, the commencement of each frequency increase in the alternating voltage provided by the generator being controlled by the leading edge of the output signal from said inverter.

5. Automatic motorway driving system comprising a specially equipped motorway having a normal driving lane and an overtaking lane and vehicles having electrically controlled steering and equipped with an installation adapted to cooperate with the motorway, wherein:
   the motorway is provided with a series of closed substantially rectangular conductive coils, buried beneath and parallel to the motorway surface with their long sides arranged symmetrically with respect to and parallel to the longitudinal axis of the normal driving lane of the motorway;
   the vehicle installation includes an alternating voltage generator, a transmitter loop connected to the generator and disposed at the front of the vehicle on the longitudinal axis thereof, two receiver loops disposed symmetrically with respect to the longitudinal axis of the vehicle at the rear of the latter and adapted to be coupled inductively with successive coils in the normal driving lane of the motorway, and a first comparison circuit connected to the two receiver loops and comparing the amplitudes of the signals picked-up by the receiver loops to provide an output signal controlling the vehicle steering,
   the motorway also including conductive coils buried parallel to the motorway surface, aligned along the axis of the overtaking lane, said coils having a substantially rectangular shape symmetrically disposed with respect to the axis of the overtaking lane and further having a supplementary loop which extends into the gap between the adjacent ends of two coils of the normal driving lane, and including a rectifying circuit connected to one of the receiver loops, an indicator connected to the output of said rectifying circuit, a gate interposed between said rectifying circuit and said indicator, means enabling said gate in response to movement of the vehicle past the end of a said coil in the normal driving lane, said gate passing an energising signal to said indicator when the overtaking lane of the motorway is occupied, and sensitive means disabling said gate.

* * * * *